US008200018B2

(12) United States Patent
Gotoh et al.

(10) Patent No.: US 8,200,018 B2
(45) Date of Patent: Jun. 12, 2012

(54) INFORMATION MANAGEMENT APPARATUS, IMAGE RECORDING APPARATUS, IMAGE PICKUP APPARATUS, IMAGE MANAGEMENT SYSTEM, IMAGE ANALYSIS INFORMATION MANAGEMENT METHOD, AND PROGRAM

(75) Inventors: Tomohiko Gotoh, Kanagawa (JP); Tamaki Kojima, Kanagawa (JP); Takeshi Fukuda, Chiba (JP); Daisuke Mochizuki, Tokyo (JP)

(73) Assignee: Sony Corporation (JP)

( * ) Notice: Subject to any disclaimer, the term of this patent is extended or adjusted under 35 U.S.C. 154(b) by 1077 days.

(21) Appl. No.: 11/825,672

(22) Filed: Jul. 5, 2007

(65) Prior Publication Data

US 2008/0018752 A1 Jan. 24, 2008

(30) Foreign Application Priority Data

Jul. 10, 2006 (JP) .............................. P2006-189894

(51) Int. Cl.
*H04N 5/76* (2006.01)
*G06K 9/54* (2006.01)
(52) U.S. Cl. ..................... 382/190; 382/307; 348/231.6; 386/E5.067; 386/E9.036
(58) Field of Classification Search .................. 382/154, 382/190, 307; 348/231.6; 386/E5.067, E9.036
See application file for complete search history.

(56) References Cited

U.S. PATENT DOCUMENTS

| 6,256,059 | B1 * | 7/2001 | Fichtner ...................... 348/222.1 |
| 6,333,752 | B1 * | 12/2001 | Hasegawa et al. ............ 715/764 |
| 6,429,896 | B1 * | 8/2002 | Aruga et al. ............. 348/231.99 |
| 6,856,706 | B2 * | 2/2005 | Yamada ......................... 382/276 |
| 7,269,292 | B2 * | 9/2007 | Steinberg ....................... 382/243 |
| 7,301,561 | B2 * | 11/2007 | Ohmura ...................... 348/207.1 |
| 2003/0059123 | A1 * | 3/2003 | Omori ............................ 382/254 |
| 2003/0090690 | A1 | 5/2003 | Katayama et al. |

FOREIGN PATENT DOCUMENTS

| JP | 2003-108416 A | 4/2003 |
| JP | 2005-151130 A | 6/2005 |
| JP | 2005-354134 A | 12/2005 |
| JP | 2006-092194 A | 4/2006 |
| JP | 2006-164191 A | 6/2006 |

OTHER PUBLICATIONS

Office Action from Chinese Application No. 200710127292, dated Feb. 27, 2009.

* cited by examiner

*Primary Examiner* — Stephen R Koziol
(74) *Attorney, Agent, or Firm* — Lerner, David, Littenberg, Krumholz & Mentlik, LLP

(57) ABSTRACT

An image management apparatus may include an input image setting information acquiring unit configured to, when image analysis information on an input image is set, acquire setting information as input image setting information, an available setting information acquiring unit configured to acquire setting information as available setting information, an update necessity determining unit configured to determine whether or not an update of the image analysis information is necessary, on the basis of a difference between the input image setting information and the available setting information, and an image analysis information setting unit configured to, when it is determined that an update of the image analysis information is necessary, perform image analysis on the input image using the second image analysis processing unit so as to set new image analysis information.

3 Claims, 11 Drawing Sheets

FIG. 2

```
<photo>
    <guid>F9D9A25C46C96C8A50E819AEAD8D4B5B</guid>
    <FullImgPath>hogehoge/DSC00167.JPG</FullImgPath>
    <CacheImgPath>hogehoge/Cache/DSC00167.JPG</CacheImgPath>
    <TimeStamp>2003:03:31 06:52:32</TimeStamp>
    <FaceInfo>
        <TotalFace>1</TotalFace>
        <FaceEntry>
            <x>0.328767</x>
            <y>0.204082</y>
            <width>0.408163</width>
            <height>0.273973</height>
            <roll>0.000000</roll>
            <pitch>0.000000</pitch>
            <yaw>0.000000</yaw>
        </FaceEntry>
    </FaceInfo>
    <SimilarityInfo>
        <ColorInfo>
            <ColorWhite>0</ColorWhite>
            <ColorBlack>0</ColorBlack>
            <ColorRed>0</ColorRed>
            <ColorYellow>0</ColorYellow>
            <ColorGreen>12</ColorGreen>
            <ColorBlue>0</ColorBlue>
        </ColorInfo>
        <VectorInfo>
            <method>Color Gaussian Feature</method>
            <vector>24f8f2374f2384f2348723f842f48273f482734fff28374f234f2374f23874f238</vector>
        </VectorInfo>
        <VectorInfo>
            <method>Texture Feature</method>
            <vector>24f8f2374f2384f2348723f842f48273f482734fff28374f234f2374f23874f238</vector>
        </VectorInfo>
        <VectorInfo>
            <method>Shape Feature</method>
            <vector>24f8f2374f2384f2348723f842f48273f482734fff28374f234f2374f23874f238</vector>
        </VectorInfo>
    </SimilarityInfo>
</photo>
```

FIG. 3

```
<metainfo>
    <guid>37DB4957492FA9D625711FBB5A7CFA3F</guid>
    <metaSFaceEnableFlag>1</metaSFaceEnableFlag>
    <metaSIBSEnableFlag>1</metaSIBSEnableFlag>
    <metaSFaceCfgInfo>
        <verMajor>SFACE 1.2.0.06013100</verMajor>
        <verMinor>IFLCore 2.4.01</verMinor>
        <cfgParam>
            {false,false,15,30,10,10,160,120,-0.8869f,-0.8869f,"MVIEW1_P12/V5",450,340}
        </cfgParam>
    </metaSFaceCfgInfo>
    <metaSIBSCfgInfo>
        <verMajor>SIBS CORE 0.6.05112400</verMajor>
        <verMinor>MDS 1.0.0</verMinor>
        <cfgParam>{30,1,2,20,10,20,2,160,120}</cfgParam>
    </metaSIBSCfgInfo>
</metainfo>
```

93

INFORMATION MANAGEMENT APPARATUS, IMAGE RECORDING APPARATUS, IMAGE PICKUP APPARATUS, IMAGE MANAGEMENT SYSTEM, IMAGE ANALYSIS INFORMATION MANAGEMENT METHOD, AND PROGRAM

CROSS-REFERENCE TO RELATED APPLICATIONS

This application claims priority from Japanese Patent Application No. JP 2006-189894 filed in the Japanese Patent Office on Jul. 10, 2006, the entire content of which is incorporated herein by reference.

BACKGROUND OF THE INVENTION

1. Field of the Invention

The present invention relates to information management systems. In particular, the present invention relates to an image management system for managing an image and analysis information on the image, an image management apparatus, an image recording apparatus, an image pickup apparatus, a processing method for the above system and apparatuses, and a program for causing a computer to execute the method.

2. Description of the Related Art

Recently, with the increasingly widespread use of image pickup apparatuses such as digital still cameras, the number of images that can be recorded in such apparatuses has increased. This increase in the recording capacity makes it difficult to manage and view recorded images. Thus, techniques have been proposed for facilitating image management. For example, additional information is set for each image and the set additional information is used as a search condition for searching for the image.

According to an image management device disclosed in Japanese Unexamined Patent Application Publication No. 2005-354134, image pickup information such as an image pickup date and a keyword is set as additional information for each image, and then a unified keyword can be set.

SUMMARY OF THE INVENTION

When images are managed by setting additional information, as in the above case, conditions under which the additional information is set may cause a problem. For example, in a case where the content of an image is analyzed using an image analysis engine and information obtained as a result of the analysis is set as additional information for the image, the image analysis engine may be updated or improved (version up) after the additional information is set. This adoption of a later version of one image analysis engine may result in the content the additional information being changed.

Even when the version of the image analysis engine is not changed, the precision of analysis may be limited due to the operating conditions of the image analysis engine. For example, in a body of a digital still camera, the analysis precision of an image analysis engine is intentionally restricted in consideration of battery consumption and performance limitations of an operating processor. In addition, image analysis with high precision may be realized by connecting the digital still camera to another device such as a server.

However, the time at which the digital still camera is connected to the server depends on a user. Thus, it is difficult to determine the type of image analysis engine by which additional information stored in the digital still camera is created, at a time when the digital still camera is connected to the server.

Thus, there is a need for a technique in which when an image and analysis information on the image are managed, the image analysis information is reset as necessary on the basis of setting information regarding an image analysis engine that has performed image analysis corresponding to the set image analysis information.

The present invention has been made in view of the above circumstance. According to an embodiment of the present invention, an image recording apparatus may include image analyzing means configured to execute predetermined image analysis processing on an input image so as to extract image analysis information, image analysis processing type acquiring means configured to acquire a type of the executed image analysis processing, and recording controlling means configured to record the image analysis information and the type of the image analysis processing in a recording medium so as to be associated with the input image. With this image recording apparatus, image analysis information and a type of image analysis information can be recorded so as to be associated with an input image. An example of a type of image analysis information is analysis engine information 93.

According to an embodiment of the present invention, an image management apparatus may include input image setting information acquiring means configured to, when image analysis information on an input image is set, acquire setting information as input image setting information, the setting information relating to a first image analysis processing unit which has set the image analysis information, available setting information acquiring means configured to acquire setting information as available setting information, the setting information relating to a second image analysis processing unit which is available, update necessity determining means configured to determine whether or not an update of the image analysis information is necessary, on the basis of a difference between the input image setting information and the available setting information, and image analysis information setting means configured to, when it is determined that an update of the image analysis information is necessary, perform image analysis on the input image using the second image analysis processing unit so as to set new image analysis information. This image management apparatus may enable control as to whether or not new image analysis information is set on the basis of input image setting information and available setting information.

In this image management apparatus, the input image setting information may contain information on a version of the first image analysis processing unit, the available setting information may contain information on a version of the second image analysis processing unit, and the update necessity determining means may determine that an update of image analysis information is necessary if the version information contained in the available setting information indicates a later version than the version information contained in the input image setting information. This arrangement may enable control as to whether or not new image analysis information is set on the basis of a difference between the version information of input image setting information and the version information of available setting information.

In addition, in the image management apparatus, the input image setting information may contain information on a parameter of the first image analysis processing unit, the available setting information may contain information on a parameter of the second image analysis processing unit, and the update necessity determining means may determine that an update of image analysis information is necessary, if the version information contained in the available setting information and the version information contained in the input image setting information indicate the same version and the parameter information contained in the available setting information may indicate a higher analysis precision than the parameter information contained in the input image setting information. This arrangement may enable control as to whether or not new image analysis information is set on the basis of a difference between the parameter information of input image setting information and the parameter information of available setting information.

Further, in the image management apparatus, the image analysis information on the input image may include analysis information on a face image contained in the input image and analysis information relating to a degree of similarity between the input image and a reference image.

Moreover, in the image management apparatus, the determination as to the necessity of an update of the image analysis information may be triggered by receipt of the input image or by an update of the second image analysis processing unit.

According to an embodiment of the present invention, an image recording apparatus may include image recording means configured to record an input image, input image setting information acquiring means configured to, when image analysis information on the input image is set, acquire setting information as input image setting information, the setting information relating to a first image analysis processing unit which has set the image analysis information, available setting information acquiring means configured to acquire setting information as available setting information, the setting information relating to a second image analysis processing unit which is available, update necessity determining means configured to determine whether or not an update of the image analysis information is necessary, on the basis of a difference between the input image setting information and the available setting information, and image analysis information setting means configured to, when it is determined that an update of the image analysis information is necessary, perform image analysis on the input image using the second image analysis processing unit so as to set new image analysis information. This image recording apparatus may enable control as to whether or not new image analysis information is set on the basis of a difference between input image setting information corresponding to an input image and available setting information.

According to an embodiment of the present invention, an image pickup apparatus may include image pickup means configured to pick up an image of a subject as an input image, input image setting information acquiring means configured to, when image analysis information on the input image is set, acquire setting information as input image setting information, the setting information relating to a first image analysis processing unit which has set the image analysis information, available setting information acquiring means configured to acquire setting information as available setting information, the setting information relating to a second image analysis processing unit which is available, update necessity determining means configured to determine whether or not an update of the image analysis information is necessary, on the basis of a difference between the input image setting information and the available setting information, and image analysis information setting means configured to, when it is determined that an update of the image analysis information is necessary, perform image analysis on the input image using the second image analysis processing unit so as to set new image analysis information. This image pickup apparatus may enable control as to whether or not new image analysis information is set on the basis of a difference between input image setting information corresponding to a picked up input image and available setting information.

According to an embodiment of the present invention, an image management system may have an image recording apparatus recording an input image and an image management apparatus managing image analysis information on the input image. The image management apparatus may include input image setting information acquiring means configured to receive the input image from the image recording apparatus, and when image analysis information on the input image is set, acquire setting information as input image setting information, the setting information relating to a first image analysis processing unit which has set the image analysis information, available setting information acquiring means configured to acquire setting information as available setting information, the setting information relating to a second image analysis processing unit which is available, update necessity determining means configured to determine whether or not an update of the image analysis information is necessary, on the basis of a difference between the input image setting information and the available setting information, and image analysis information setting means configured to, when it is determined that an update of the image analysis information is necessary, perform image analysis on the input image using the second image analysis processing unit so as to set new image analysis information, and image analysis information supplying means configured to supply the new image analysis information to the image recording apparatus. This image management system may enable control as to whether or not new image analysis information is set and supplied from the image management apparatus to the image recording apparatus, on the basis of a difference between input image setting information and available setting information.

According to the present invention, when an image and analysis information on the image are managed, the image analysis information can advantageously be reset as necessary on the basis of setting information relating to an image analysis engine that has performed image analysis corresponding to the set image analysis information.

BRIEF DESCRIPTION OF THE DRAWINGS

FIG. 2 illustrates an example of image analysis information according to an embodiment of the present invention;

FIG. 3 illustrates an example of analysis engine information according to an embodiment of the present invention;

DETAILED DESCRIPTION

In the following, the preferred embodiments of the present invention will be described in detail with reference to the accompanying drawings.

Figure 1:
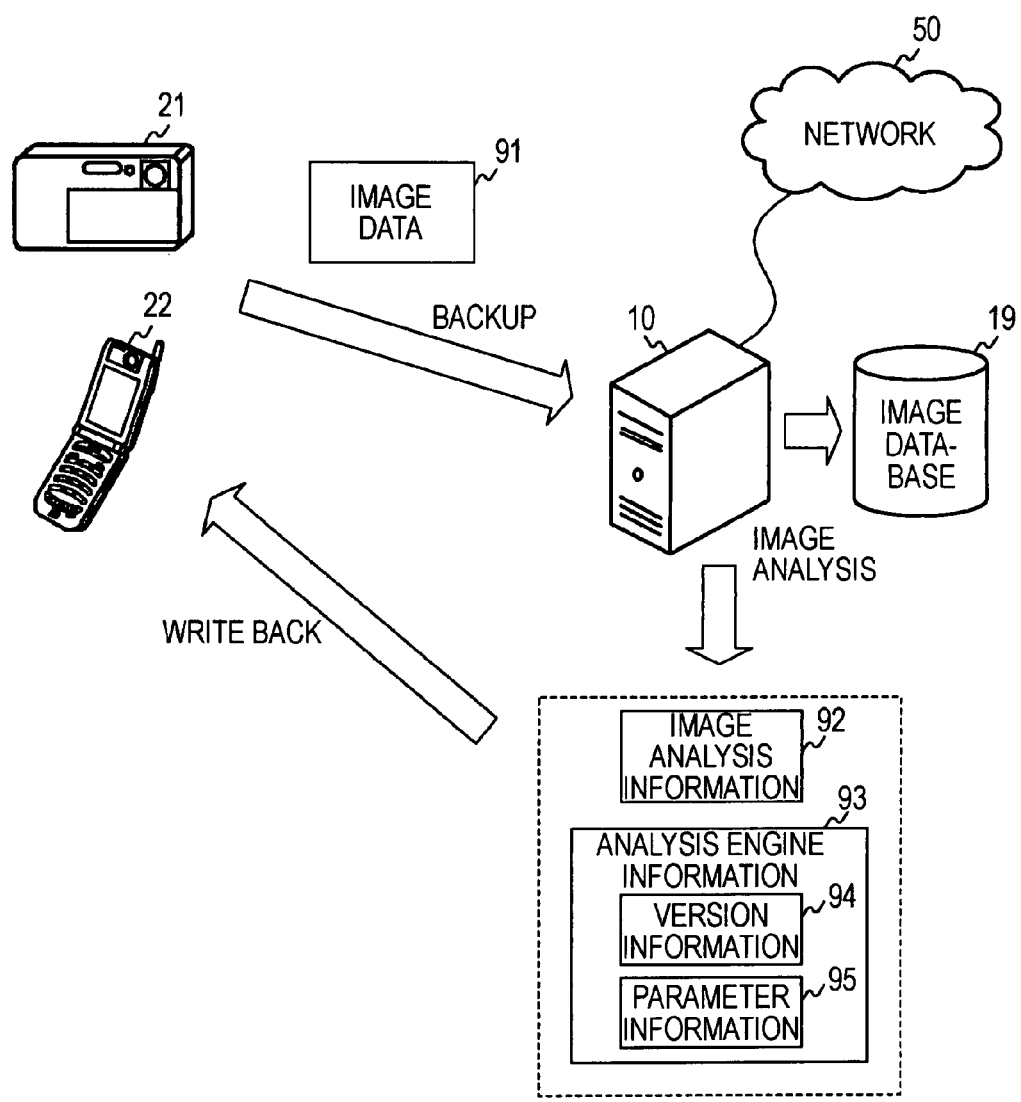
FIG. 1 illustrates an entire configuration of an image management system according to an embodiment of the present invention.

FIG. 1 illustrates an example of an entire configuration of an image management system according to an embodiment of the present invention. The system includes a server 10, an image database 19, a digital still camera 21, and a mobile phone 22.

The server 10 stores image data 91 input from the digital still camera 21 or the mobile phone 22 in the image database 19. The image database 19 stores the image data 91 input from the digital still camera 21 or the mobile phone 22. The image database 19 manages the image data 91 together with analysis information on an image contained in the image data 91. Each piece of the image data 91, a corresponding thumbnail image, and corresponding image analysis information are provided with a common content identifier so as to be linked to each other.

The server 10 has an image analysis engine for performing image analysis on the input image data 91 as necessary. This image analysis engine can be implemented as a program operating on a computer or as a hardware device.

When the image analysis engine is implemented as a program, the program can be updated or modified via a network 50. Through this update or modification, the version of the image analysis engine is changed. Such processing of changing the version of an image analysis engine is referred to as version-up. In addition, when the image analysis engine is implemented as a hardware device, version up is executed by the replacement of a circuit board, for example.

The content of image analysis performed by the image analysis engine includes, for example, analysis of an image of a human face contained in an image and analysis of a degree of similarity between the image and a reference image. A result of the image analysis is output as image analysis information 92. In addition, analysis engine information 93 is also output as information on the image analysis engine that has generated the analysis result. The analysis engine information 93 can include version information 94, which is information on a version of the image analysis engine, and parameter information 95, which is information on a parameter provided to the image analysis engine.

The image analysis information 92 and the analysis engine information 93 generated by the image analysis engine are managed by the image database 19 together with the image data 91, and then written back to the digital still camera 21 or the mobile phone 22 that has input the image data 91.

The digital still camera 21 and the mobile phone 22 are examples of image recording apparatuses for recording the image data 91. For example, the digital still camera 21 has an image pickup unit for picking up an image of a subject as an input image and stores the image data 91 of the picked up image in an internal memory, an external recording medium or the like. If the mobile phone 22 has an image pickup function, the mobile phone 22 can similarly record images.

The image data 91 is not limited to a picked up image. For example, an image acquired from an external unit using a communication function can also be stored as the image data 91 in the internal memory, the external recording medium, or the like.

The digital still camera 21 and the mobile phone 22 can also contain image analysis engines, which permit image analysis of the recorded image data 91. However, in general, the battery consumption and processor performance of such a portable-type device are often limited, and thus it is difficult to perform precise image analysis using a single portable-type device. Thus, when the digital still camera 21 or the like contains an image analysis engine, image analysis is first performed in a simple manner using the image analysis engine, and then detailed image analysis can be performed after the image data 91 is transferred to the server 10. With this arrangement, image analysis with high precision can be executed using the server 10 having high operating performance. In addition, a result of the image analysis is rewritten back to the digital still camera 21 or the like, so that the analysis result with high precision can be stored in the digital still camera 21 or the like.

FIG. 2 illustrates an example of the image analysis information 92 according to an embodiment of the present invention. The image analysis information 92 can be provided as metadata for image data and can be described in a text format or a binary format. In this example, the image analysis information 92 is assumed to be described in an XML (extensible Mark-up Language) format.

A <photo> tag pair indicates image analysis information. In an XML format, a description placed between a start tag and a corresponding end tag represents the content of a tag pair. For example, a start tag of the <photo> tag is expressed as "<photo>" and a corresponding end tag is expressed as "</photo>".

A <guid> tag pair indicates a content identifier of a corresponding image. The content identifier is composed of 128 bits and provided commonly to the image (original image) and a reduced image of the image (thumbnail image).

A <FullImgPath> tag pair indicates a location of a file containing the image data of the original image by a file path and a file name. A <CacheImgPath> tag pair indicates a location of a file containing image data of the reduced image by a file path and a file name.

A <TimeStamp> tag pair indicates date and time when the image was captured. The example of FIG. 2 indicates that the image was captured at 6:52:32, on Mar. 31 2003.

A <FaceInfo> tag pair indicates information on an image of a face of a human or the like (hereinafter referred to as a face image) included in the image corresponding to the image data. Such information is generated by a face detection engine in the image analysis engine. In accordance with the number of face images included in the image, information on each face image is described as follows.

A <TotalFace> tag pair indicates the total number of face images contained in the image data. The example of FIG. 2 indicates that the number of face images contained in the image data is "1".

A <FaceEntry> tag pair indicates specific information on each face image. Since only one face images is contained in the image data in this example, only one <FaceEntry> tag pair is provided.

An <x> tag pair indicates a position in a face image in a horizontal direction (X direction) of a face image. The example of FIG. 2 indicates that the position of the right end of the face image in the horizontal direction is "0.328767", where the left end of the entire image corresponding to the image data is represented as "0.0" and the right is represented as "1.0". A <y> tag pair indicates a position in the face image in a vertical direction (Y direction). The example of FIG. 2 indicates that the position of the upper end of the face image in the vertical direction is "0.204082", where the upper end of the entire image is represented as "0.0" and the lower end of the image is represented as "1.0". Specifically, a normalized value corresponding to a position in the face image with respect to the horizontal direction is written between the <x> tag and the </x> tag, and a normalized value corresponding to a position in the face image with respect to the vertical direction is written between the <y> tag and the </y> tag.

A <width> tag pair indicates a width of a face image (size in the horizontal direction). In this example, the width of the face image is "0.408163", where the width of the entire image corresponding to the image data is represented as "1.0". A <height> tag pair indicates a height of the face image (size in the vertical direction). In this example, the height of the face image is "0.273973", where the height of the entire image is represented as "1.0". Specifically, a normalized value corresponding to the width of the face image is written between the <width> tag and the </width> tag, and a normalized value corresponding to the height of the face image is written between the <height> tag and the </height> tag.

A <roll> tag pair indicates a roll angle of a face image (an angle of rotation around a longitudinal axis (x-axis) indicative of a position of the face image in the superior/inferior direction). In this example, it is indicated that the roll angle of the face image is "0.000000".

A <pitch> tag indicates a pitch angle of a face image (an angle of rotation around a transverse axis (y-axis) indicative of a position of the face image in the right/left direction). In this example, it is indicated that the pitch angle of the face image is "0.000000".

A <yaw> tag pair indicates a yaw angle of a face image (an angle of rotation around a normal axis (z-axis) indicative of a position of the face image in the anteroposterior direction). In this example, it is indicated that the yaw angle of the face image is "0.000000".

A <SimilarityInfo> tag pair indicates information on a feature quantity representing a degree of similarity between images. This information is generated by an image similarity analysis engine in an image analysis engine. In this example, feature quantities for calculating a degree of association indicative of a degree in which the image is associated with a predetermined color name and a degree of similarity to another image in terms of color or frequency components are described as follows.

A <ColorInfo> tag pair indicates a degree of association indicative of a degree in which the image data is associated with a predetermined color name. In this example, degrees of association in terms of six colors are described. A <ColorWhite> tag pair, a <ColorBlack> tag pair, a <ColorRed>tag pair, a <ColorYellow> tag pair, and a <ColorGreen> tag pair indicate degrees in which the image data is associated with colors of white, black, red, yellow, green, and blue, respectively. As shown in FIG. 2, the degree of association in terms of green is "12" percent and the degree of association in terms of each of the other colors is "0" percent.

A <VectorInfo> tag pair indicates a feature quantity representing a degree of similarity between images. In this example, three <VectorInfo> tag pairs are provided, and a <method> tag pair and a <vector> tag pair are written between each of the <VectorInfo> tag and </VectorInfo> tags. The <method> tag pair indicates a method for obtaining a degree of similarity in terms of a specific feature. The <vector> tag pair indicates a vector representing a corresponding feature quantity. In the example of FIG. 2, a feature quantity for color based on a Gaussian model, a feature quantity for pattern, and a feature quantity for shape are described.

FIG. 3 illustrates an example of the analysis engine information 93 according to an embodiment of the present invention. This analysis engine information 93 may be provided as metadata for image data and written either in a text format or in a binary format. In this example, it is assumed that the analysis engine information 93 is written in an XML format.

A <metainfo> tag pair indicates analysis engine information. A <guid> tag pair indicates a content identifier of a corresponding image, similarly to the example of FIG. 2.

A <metaSFaceEnableFlag> tag pair indicates whether or not a face image is detected in the image content. In this example, "1", indicating that a face image is detected in the image content, is written.

A <metaSIBSEnableFlag> tag pair indicates whether or not similar image analysis has been performed on the image content. In this example, "1", indicating that similar image analysis has been performed on the image content, is written.

A <metaSFaceCfgInfo> tag pair indicates information related to face detection including version information and parameter information regarding a face detection engine, as described below.

A <verMajor> tag pair indicates major version information. The example of FIG. 3 indicates that the major version is "SFACE 1.2.0.06013100". The number placed subsequent to "SFACE" indicative of a face detection engine is a major version number in which a large number indicates a later version.

A <verMinor> tag pair indicates minor version information. The example of FIG. 3 indicates that the minor version is "IFLCore 2.4.01". The number placed subsequent to "IFLCore" indicative of a type of a face detection engine is a minor version number in which a larger number indicates a later version.

In the above example, the version information of the face detection engine includes the major version information and the minor version information. However, unified version information can be employed as the version information of the face detection engine.

Items written between the <FaceEntry> tags described with reference to FIG. 2 may depend on the version of a face detection engine. For example, when the version of the face detecting engine is old, the tags indicating the orientation of a face image such as the <roll>, <pitch>, and <yaw> tags may not be included. On the other hand, when the version of the face detecting engine is new, a tag pair indicative of a face expression may be included.

Referring back to FIG. 3, a <cfgParam> tag pair indicates parameter information. In this example, a parameter provided to the face detecting engine is "{false,false,15,30,10,10,160, 120,−0.8869f,−0.8869f, "MVIEWI_P12/V5",450,340}". The two numbers provided at the end of the parameter (i.e., 450 and 340) indicate the resolution in which face detection is performed as a size in the horizontal and vertical directions. The example of FIG. 3 indicates that the resolution of face detection is 450 horizontal pixels×340 vertical pixels. That is, the precision of face detection increases as the size increases and decreases as the size decreases.

For example, when the resolution of face detection is 315 horizontal pixels×236 vertical pixels, the level of detection precision is not high. However, in this case, only a small amount of computation is necessary for the face detection. On the other hand, when the resolution of the face detection is 550 horizontal pixels×412 vertical pixels, a large amount of computation is necessary whereas the level of detection precision is high. In addition, when the resolution of the face detection is 450 horizontal pixels×340 vertical pixels, face detection with an intermediate level of precision and an intermediate amount of computation can be achieved.

The total number of face images written between the <TotalFace> tags described with reference to FIG. 2 may depend on the parameter of the face detection engine. For example, an increase in detection precision indicated by the parameter may indicate an increase in the total number of face images that can be detected.

A <metaSIBSCfgInfo> tag pair indicates information relating to image similarity analysis which includes version information and parameter information of an image similarity analysis engine, as described below.

A <verMajor> tag pair indicates major version information. The example of FIG. 3 indicates that the major version is "SIBS CORE 0.6.05112400". Specifically, the number placed subsequent to "SIBS CORE" indicative of an image similarity analysis engine is a major version number in which a large number indicates a later version.

A <verMinor> tag pair indicates minor version information. The example of FIG. 3 indicates that the minor version is "MDS 1.0.0". Specifically, the number placed subsequent to "MDS" indicative of a type of image similarity analysis engine is a minor version number in which a larger number indicates a later version.

In the above example, the version information of the image similarity analysis engine includes the major version information and the minor version information. However, unified version information can be employed as the version information of the image similarity analysis engine.

The number of colors written between the <ColorInfo> tags may depend on the version of the image similarity analysis engine. For example, if the version is updated, the number of colors written between the <ColorInfo> tags may be increased.

A <cfgParam> tag pair indicates parameter information. The example of FIG. 3 indicates that a parameter provided to the image similarity analysis engine is "{30,1,2,20,10,20,2, 160,120}". The two numbers placed at the end of the parameter (i.e., 160 and 120) indicate resolution in which similar image analysis is performed as a size in the horizontal and vertical directions (in this example, the resolution of face detection is 160 horizontal pixels×120 vertical pixels). That is, the precision of face detection increases as the size increases and decreases as the size decreases.

For example, when the resolution of face detection is 160 horizontal pixels×120 vertical pixels, the level of detection precision is not high. However, in this case, only a small amount of computation is necessary for the face detection. On the other hand, when the resolution of the face detection is 640 horizontal pixels×480 vertical pixels, a large amount of computation is necessary whereas the level of detection precision is high. In addition, when the resolution of the face detection is 320 horizontal pixels×240 vertical pixels, face detection with an intermediate level of precision and an intermediate amount of computation can be achieved.

The accuracy of a degree of association indicated by the <ColorInfo> tags and the accuracy of a feature quantity indicated by the <VectorInfo> tags which are described with reference to FIG. 2 may depend on the parameter of the image similarity analysis engine. For example, an increase in a parameter indicating detection precision (precision parameter) may increase the accuracy of the degree of association and the feature quantity.

Figure 4:
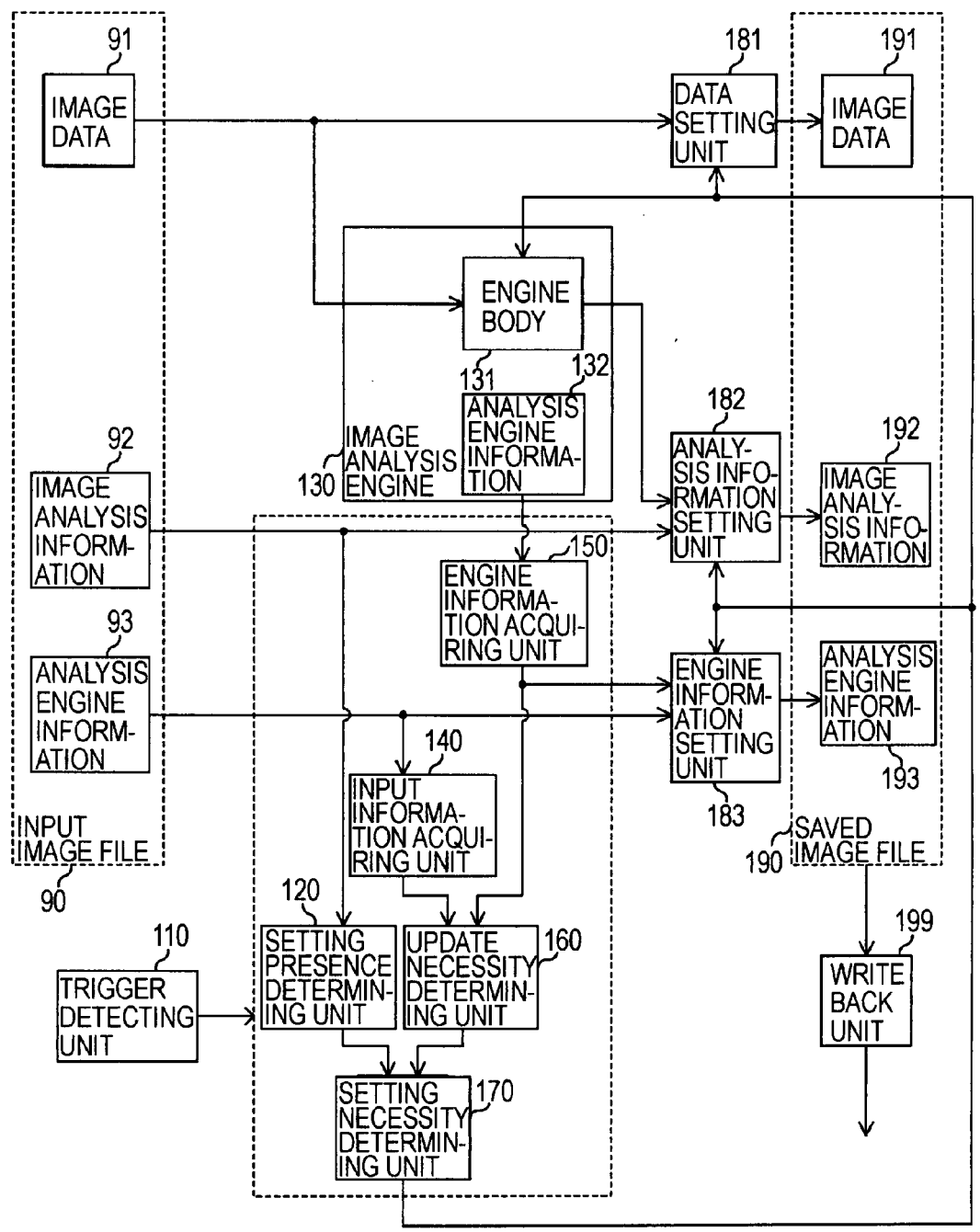
FIG. 4 illustrates a functional configuration of an image management apparatus according to an embodiment of the present invention.

FIG. 4 illustrates a functional configuration of an image management apparatus according to an embodiment of the present invention. This image management apparatus receives an input image file 90 and outputs a saved image file 190. As described above, the input image file 90 contains the image data 91, the image analysis information 92, and the analysis engine information 93, as described above. Likewise, the saved image file 190 contains image data 191, image analysis information 192, and analysis engine information 193. The saved image file 190 is stored in the image database 19.

The image management apparatus has a trigger detecting unit 110, a setting presence determining unit 120, a image analysis engine 130, an input information acquiring unit 140, an engine information acquiring unit 150, an update necessity determining unit 160, a setting necessity determining unit 170, a data setting unit 181, an analysis information setting unit 182, an engine information setting unit 183, and a write back unit 199.

The trigger detecting unit 110 detects a trigger for setting image analysis information. Types of trigger will be described below.

The image analysis engine 130 performs image analyses on the image data 91. The content of the image analysis performed by the image analysis engine 130 includes, for example, analysis of a face image contained in the image and analysis of a degree of similarity between the image and a reference image. The image analysis engine 130 stores analysis engine information 132 as information on an engine body 131. This analysis engine information 132 contains version information and parameter information on the engine body 131.

The setting presence determining unit 120 determines whether or not the image analysis information 92 is set in the input image file 90. A result of the determination is supplied to the setting necessity determining unit 170.

When the input image file 90 contains the analysis engine information 93, the input information acquiring unit 140 acquires the analysis engine information 93. The analysis engine information 93 acquired by the input information acquiring unit 140 is supplied to the update necessity determining unit 160.

The engine information acquiring unit 150 acquires the analysis engine information 132 of the image analysis engine 130. The analysis engine information 132 acquired by the engine information acquiring unit 150 is supplied to the update necessity determining unit 160.

The update necessity determining unit 160 determines whether or not an update of image analysis information is necessary, on the basis of a difference between the analysis engine information 93 of the input image file 90 acquired by the input information acquiring unit 140 and the analysis engine information 132 of the image analysis engine 130 acquired by the engine information acquiring unit 150. A result of the determination performed by the update necessity determining unit 160 is supplied to the setting necessity determining unit 170.

When the version indicated in the analysis engine information 132 of the image analysis engine 130 is later than the version indicated in the analysis engine information 93 of the input image file 90, the update necessity determining unit 160 determines that an update of image analysis information is necessary. Specifically, if the version of image analysis engine 130 that is available is later than an image analysis engine that has generated the image analysis information 92, the update necessity determining unit 160 determines that the image analysis information 92 needs to be reset using the image analysis engine 130.

In addition, when the version indicated in the analysis engine information 132 of the image analysis engine 130 and the version indicated in the analysis engine information 93 of the input image file 90 are the same, and the precision parameter contained in the analysis engine information 132 of the image analysis engine 130 is higher than the precision parameter contained in the analysis engine information 93 of the input image file 90, the update necessity determining unit 160 also determines that an update of image analysis information is necessary. Specifically, when the image analysis engine 130 that is available is capable of performing analysis with higher precision than the image analysis engine corresponding to the analysis engine information 93, the update necessity determining unit 160 determines the image analysis information 92 needs to be reset even if the versions of both the image analysis engine are the same.

When the image analysis engine includes a plurality of modules as in the above example, (i.e., the face detecting engine and the image similarity analysis engine in the example of FIG. 3), image analysis can be performed only for a desired module.

The setting necessity determining unit 170 determines whether or not the image analysis information 192 is set in accordance with the image data 191. The setting necessity determining unit 170 determines that the image analysis information 192 needs to be set, when the setting presence determining unit 120 determines that the image analysis information 92 is not set in the input image file 90 or when the update necessity determining unit 160 determines that an update of image analysis information is necessary. A result of the determination of the setting necessity determining unit 170 is supplied to the image analysis engine 130, the data setting unit 181, the analysis information setting unit 182, and the engine information setting unit 183.

If the setting necessity determining unit 170 determines that the image analysis information 192 needs to be set, the image analysis engine 130 performs image analysis on the image data 91. Then, the data setting unit 181 saves the image data 91 as the image data 191, the result of the analysis performed by the image analysis engine 130 is set as the image analysis information 192, and the analysis engine information 132 of the image analysis engine 130 is set as the analysis engine information 193.

On the other hand, when the setting necessity determining unit 170 determines that the image analysis information 192 does not need to be set, the image analysis engine 130 does not perform image analysis. Then, the data setting unit 181 saves the image data 91 as the image data 191. At this time, if the image analysis information 92 has already been set, the image analysis information 92 is saved as the image analysis information 192, and the analysis engine information 93 is saved as the analysis engine information 193.

The write back unit 199 writes output of the image analysis engine 130 back to a source of the input image file 90. When the image analysis information 192 is set by the image analysis engine 130, the write back unit 199 writes the image analysis information 192 and the corresponding analysis engine information 132 (analysis engine information 193) back to the source as necessary. It is possible to determine beforehand whether or not such write back is necessary.

Now, cases where an update of image analysis information is necessary according to an embodiment of the present invention will be described.

Figure 5:
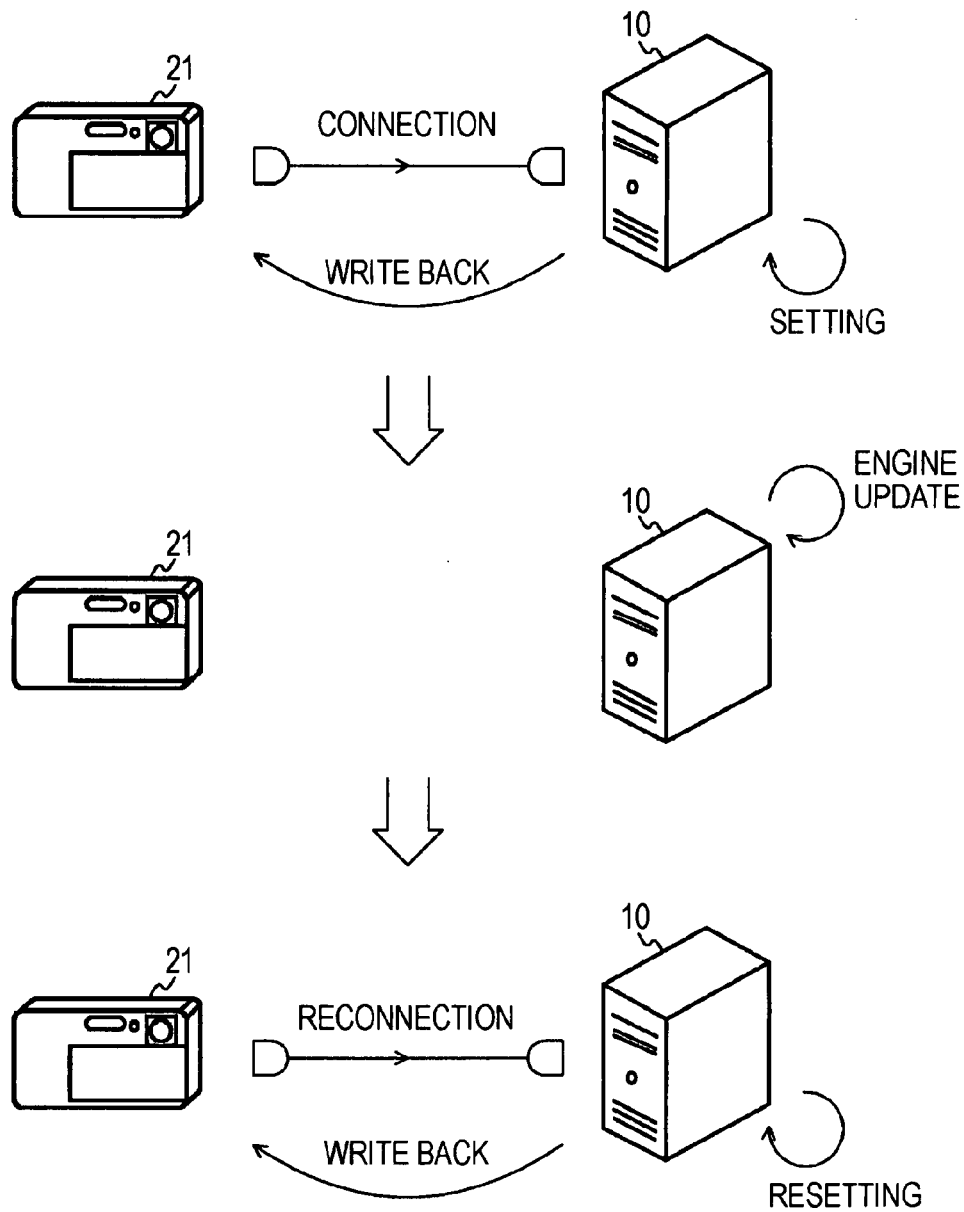
FIG. 5 illustrates a first example of a case in which an update of image analysis information is necessary, according to an embodiment of the present invention.

FIG. 5 illustrates a first example of the case in which an update of image analysis information is necessary according to an embodiment of the present invention. In this example, the digital still camera 21 serves as an image recording apparatus, and the server 10 serves as an image management apparatus. The server 10 has an image analysis engine. It is assumed that the digital still camera 21 does not have an image analysis engine or does have an image analysis engine of an old version or an image analysis engine with low image analysis precision.

Here, a case is assumed in which the digital still camera 21 is connected to the server 10 so that images recorded in the digital still camera 21 are backed up. Upon the connection to the digital still camera 21, the server 10 performs setting of image analysis information for image data. Then, the image analysis information is written back to the digital still camera 21. As a result, the image analysis information processed by the image analysis engine of the newest version at this time is reflected on the digital still camera 21. When the write back is completed, the digital still camera 21 and the server 10 are disconnected.

It is further assumed that version-up of the image analysis engine is executed in the server 10 after the write back described above. In this case, when the digital still camera 21 is connected to the server 10 again, the server 10 performs setting of image analysis information for the image data again, since the version of the image analysis engine of the server 10 is later than the version corresponding to image analysis information stored in the digital still camera 21 (or the precision parameter of the image analysis engine of the server 10 is higher than the precision parameter corresponding to the image analysis information of the digital still camera 21). Then, new image analysis information obtained as a result of the reset of image analysis information is written back to the digital still camera 21.

In this example, the trigger detecting unit 110 detects the connection between the digital still camera 21 and the server 10. This connection serves as a trigger for causing the necessity determining unit 170 to determine whether or not setting of image analysis information is necessary.

In the above example, the case is described where the version of the image analysis engine of the server 10 is updated. However, there may also be a case where the digital still camera 21 is connected to another server after being disconnected from the server 10, and the version of an image analysis engine of the other server is later than that of the server 10 (or the precision parameter provided to the other server is higher than that provided to the server 10). Also in such a case, the procedure of the first example described above is similarly executed.

Figure 6:
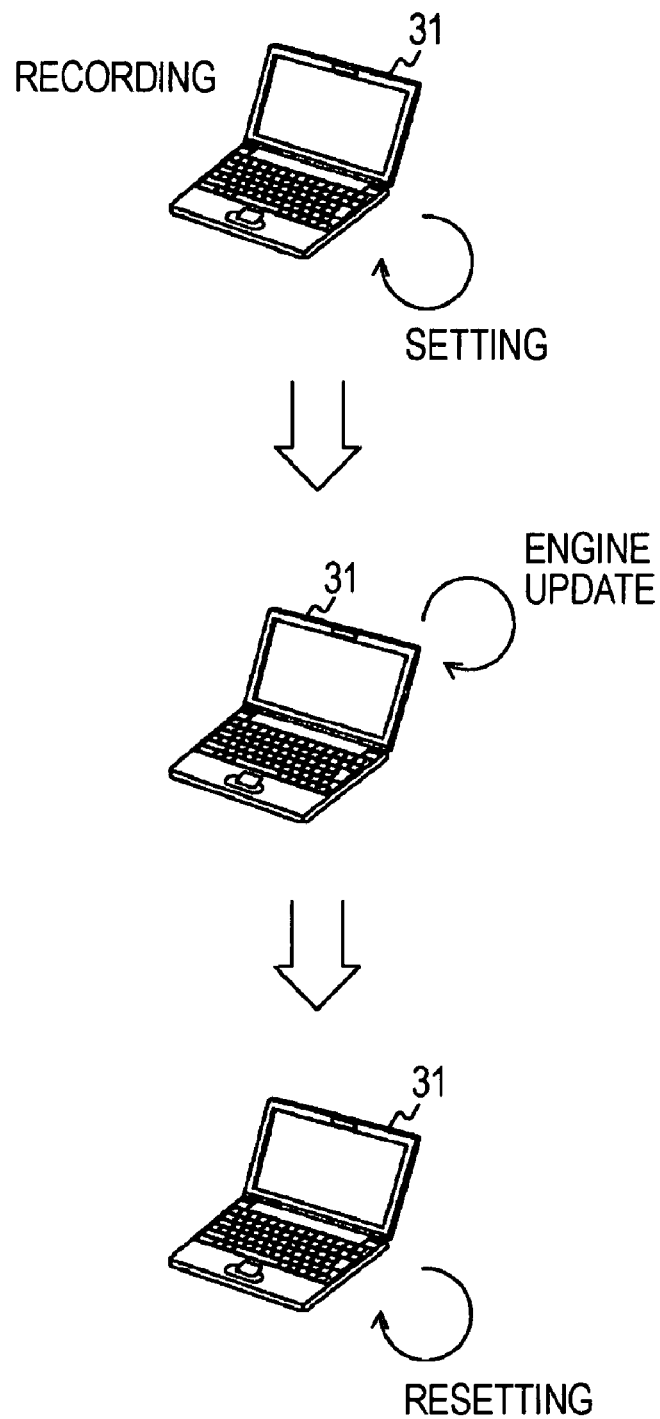
FIG. 6 illustrates a second example of a case in which an update of image analysis information is necessary, according to an embodiment of the present invention.

FIG. 6 illustrates a second example of the case in which an update of image analysis information is necessary according to an embodiment of the present invention. In this example, it is assumed that a computer 31 has an image analysis engine and functions of both an image recording apparatus and an image management apparatus.

The computer 31 has an image recording unit for recording input image data. After recording image data, the computer 31 sets image analysis information on the image data using the image analysis engine. Here, it is assumed that a version-up of the image analysis engine is performed after the image analysis information is set in the computer 31.

This version-up acts as a trigger for causing the computer 31 to reset the image analysis information on the image data using the version-updated image analysis engine.

In this example, the trigger detecting unit 110 detects the version-up of the image analysis engine of the computer 31, and the version-up acts as a trigger for causing the setting necessity determining unit 170 to determine whether or not setting of image analysis information is necessary.

Figure 7:
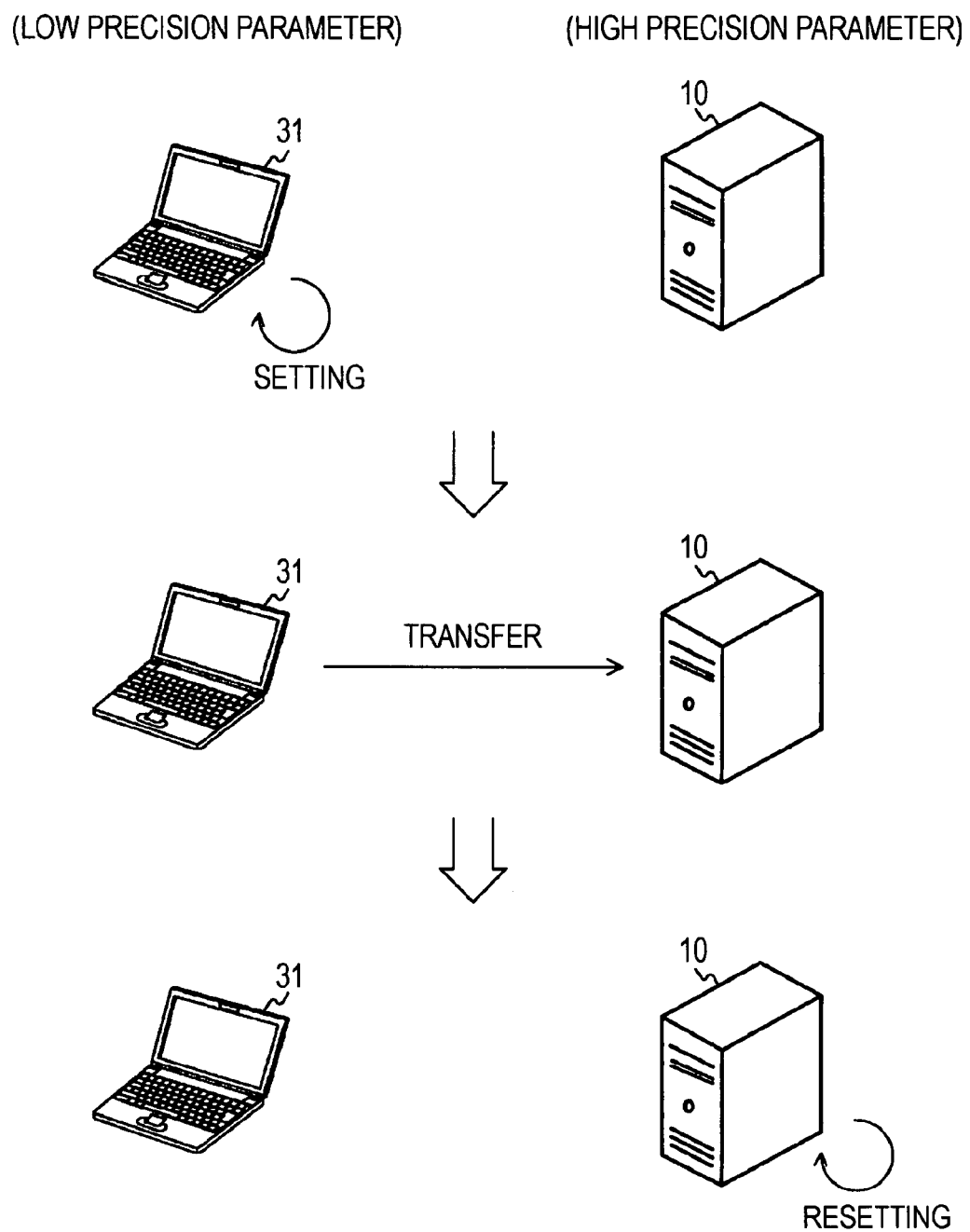
FIG. 7 illustrates a third example of a case where an update of image analysis information is necessary, according to an embodiment of the present invention.

FIG. 7 illustrates a third example of the case in which an update of image analysis information is necessary according to an embodiment of the present invention. In this example, it is assumed that each of the computer 31 and the server 10 has an image analysis engine of the same version. For example, an image analysis engine of the latest version is provided from another server (not shown) to each of the computer 31 and the server 10. However, it is also assumed that the precision parameter of the image analysis engine of the computer 31 is lower than that of the image analysis engine of the server 10.

In this example, it is assumed that after the image analysis information is set in the image analysis engine of the computer 31, the computer 31 transfers the image analysis information and corresponding image data and analysis engine information to the server. Since the precision parameter corresponding to the transferred image analysis information is lower than the precision parameter of the image analysis engine of the server 10, the server 10 performs resetting of image analysis information on the image data.

In this example, the trigger detecting unit 110 detects the transfer of the image data from the computer 31, and this transfer acts as a trigger for causing the setting necessity determining unit 170 to determine whether or not setting of image analysis information is necessary.

Figure 8A:
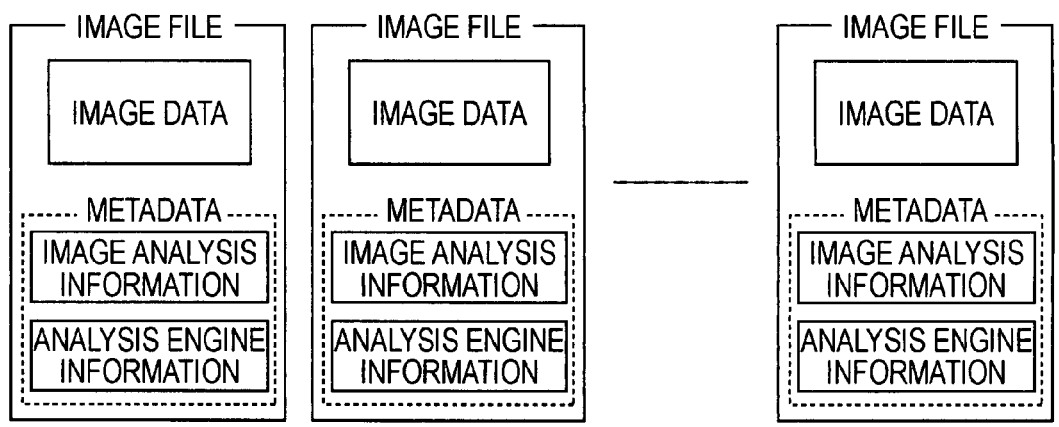
FIG. 8A to 8C illustrate examples of relationships between image data and image analysis information, according to an embodiment of the present invention.
Figure 8B:
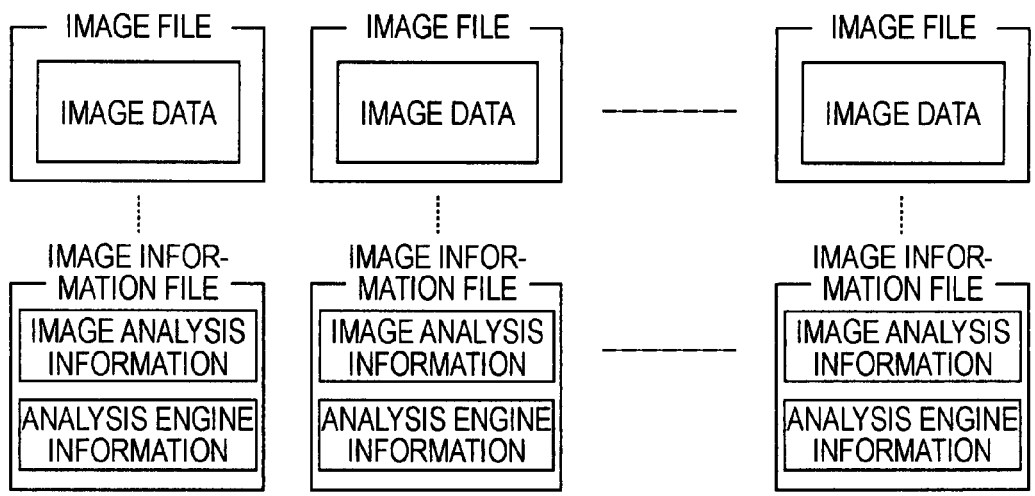
Figure 8C:
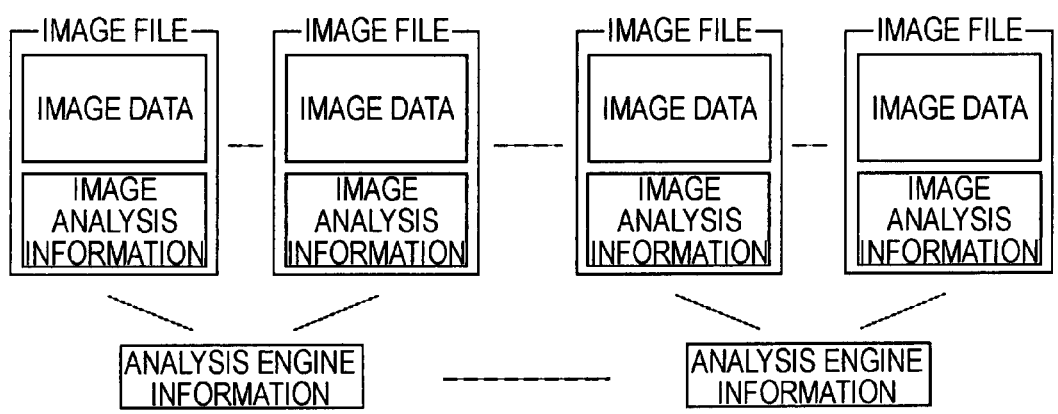

FIGS. 8A to 8C illustrate examples of relationships between image data and image analysis information according to an embodiment of the present invention. In the foregoing description, image data, image analysis information, and analysis engine information are assumed to be contained in one image file. For example, as illustrated in FIG. 8A, image analysis information and analysis engine information corresponding to each image data are provided as metadata in one image file. Such a file configuration advantageously increases independence of each image file and facilitates management of individual image files.

Various correspondence relationships between image data and image analysis information are possible. For example, as illustrated in FIG. 8B, image analysis information and analysis engine information are provided independently as an image information file, and an image file contains only image data. With this arrangement, image data, and a pair of image analysis information and analysis engine information can be stored in different recording media. In this case, it is necessary to link the image data to the pair of image analysis information and analysis engine information using a common identifier.

Note that there is not necessarily a one-to-one correspondence between image data and analysis engine information. For example, as illustrated in FIG. 8C, it is also possible a piece of analysis engine information is provided for a plurality of pieces of image data and image analysis information. With this arrangement, it is no longer necessary to update analysis engine information which is otherwise contained in all image files every time a corresponding analysis engine is updated. Note that in this case it is necessary to link a pair of image data and image analysis information to corresponding analysis engine information using a common identifier.

Figure 9A:
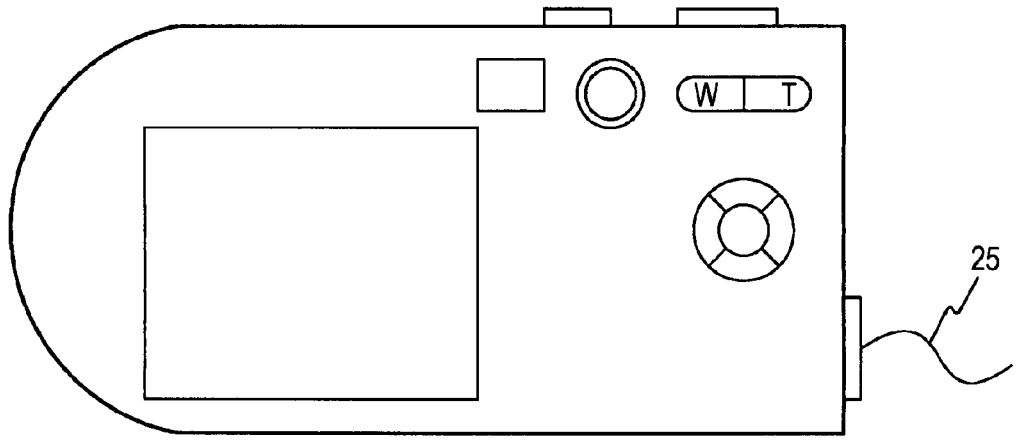
FIGS. 9A and 9B are schematic views of an operation part of a digital still camera according to an embodiment of the present invention.
Figure 9B:
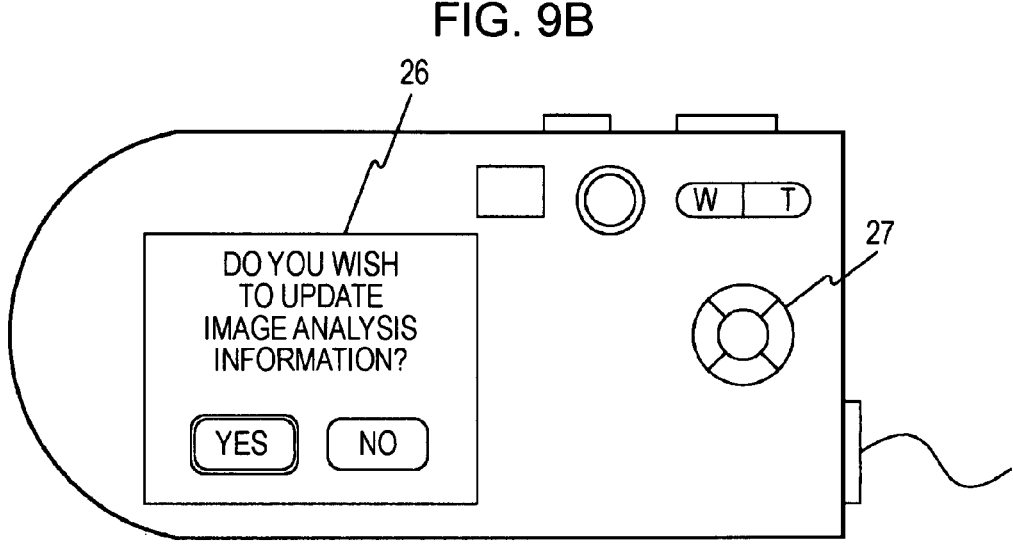

FIGS. 9A and 9B are schematic views illustrating an operation part of the digital still camera 21. As illustrated in FIG. 9A, when the digital still camera 21 is connected to the server 10 through an interface 25, it is determined whether or not image analysis using an image analysis engine of the server 10 is necessary, as described with reference to FIG. 4 and FIG. 5.

If it is determined that setting of image analysis information is necessary, a confirmation message "Do you wish to update image analysis information?" is displayed on a display 26 of the digital still camera 21. In response to the message, a user operates a select button 27 to enable or disable the update. When the update is enabled, the image analysis information is written back from the server 10 to the digital still camera 21.

The write back of image analysis information can also be performed automatically, without displaying such a confirmation message.

In the following, an operation of an image management apparatus according to an embodiment of the present invention will be described.

Figure 10:
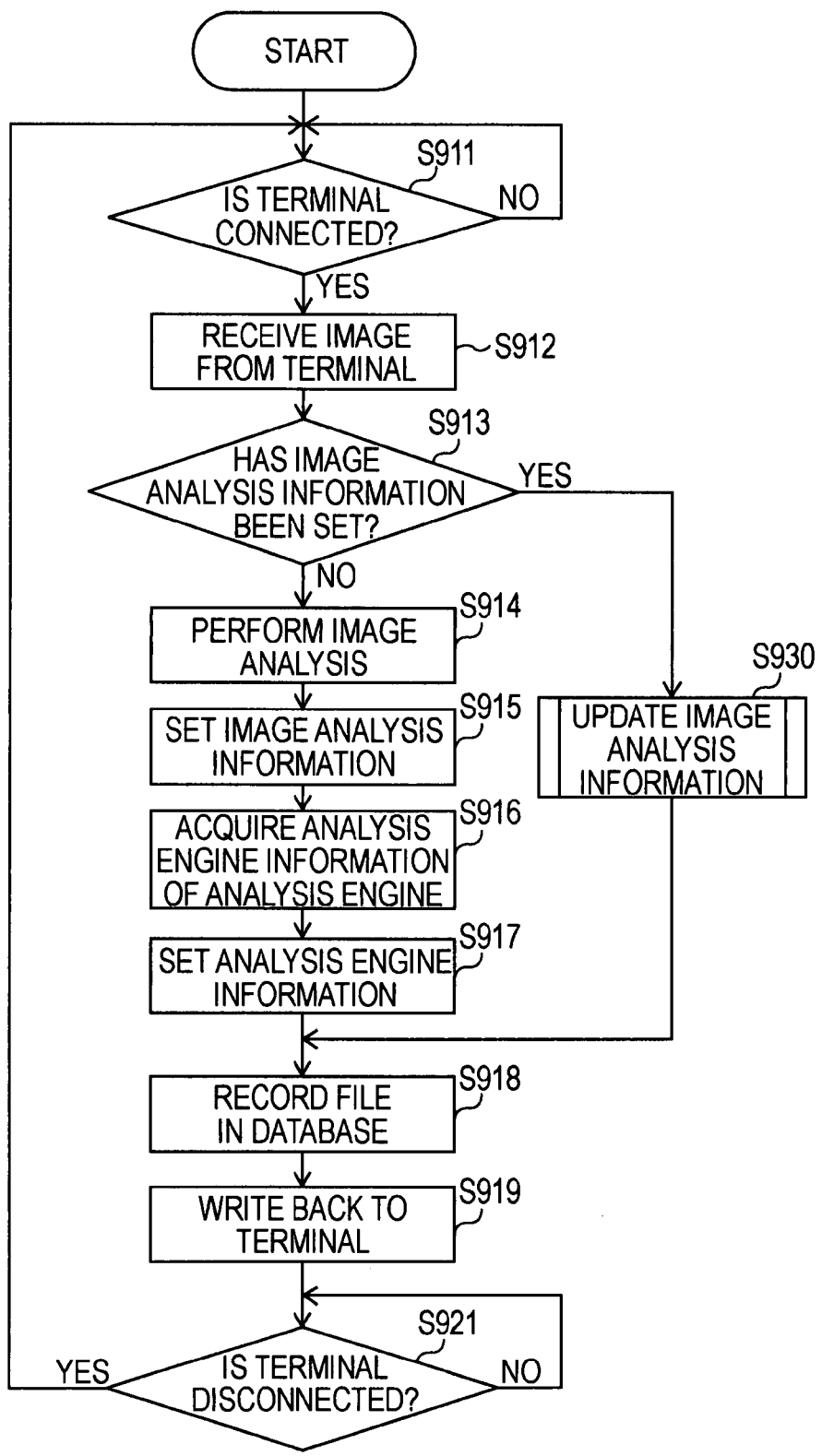
FIG. 10 illustrates a processing procedure performed by an image management apparatus according to an embodiment of the present invention.

FIG. 10 illustrates an example of a processing procedure performed by an image management apparatus which corresponds to the server 10 of FIG. 5. In this example, an apparatus corresponding to the digital still camera 21 of FIG. 5 is referred to as a "terminal".

When the trigger detecting unit 110 detects a connection to the terminal (STEP S911), the image management apparatus receives the input image file 90 from the terminal, and the data setting unit 181 saves the received file as the image data 191 of the saved image file 190 (STEP S912).

If the setting presence determining unit 120 determines the image analysis information 92 has already been set (YES, in STEP S913), the procedure proceeds to processing of updating the image analysis information 92 (STEP S930).

On the other hand, if the setting presence determining unit 120 determines that the image analysis information 92 has not been set, the following processing is performed. Specifically, the image analysis engine 130 performs image analysis on the image data 91 (STEP S914). As a result, the analysis information setting unit 182 sets the image analysis information 192 of the saved image file 190 (STEP S915). In addition, the engine information acquiring unit 150 acquires the analysis engine information 132 of the image analysis engine 130 (STEP S916), and the engine information setting unit 183 sets the acquired analysis engine information 132 as the analysis engine information 193 of the saved image file 190 (STEP S917).

The saved image file 190 generated through the above procedure is recorded in the image database 19 (STEP S918). The image analysis information obtained by the image analysis engine 130 and the analysis engine information 132 of the image analysis engine 130 are written back to the terminal (STEP S919).

After the terminal is disconnected from the image management apparatus, the trigger detecting unit 110 waits for another connection (STEP S921).

Figure 11:
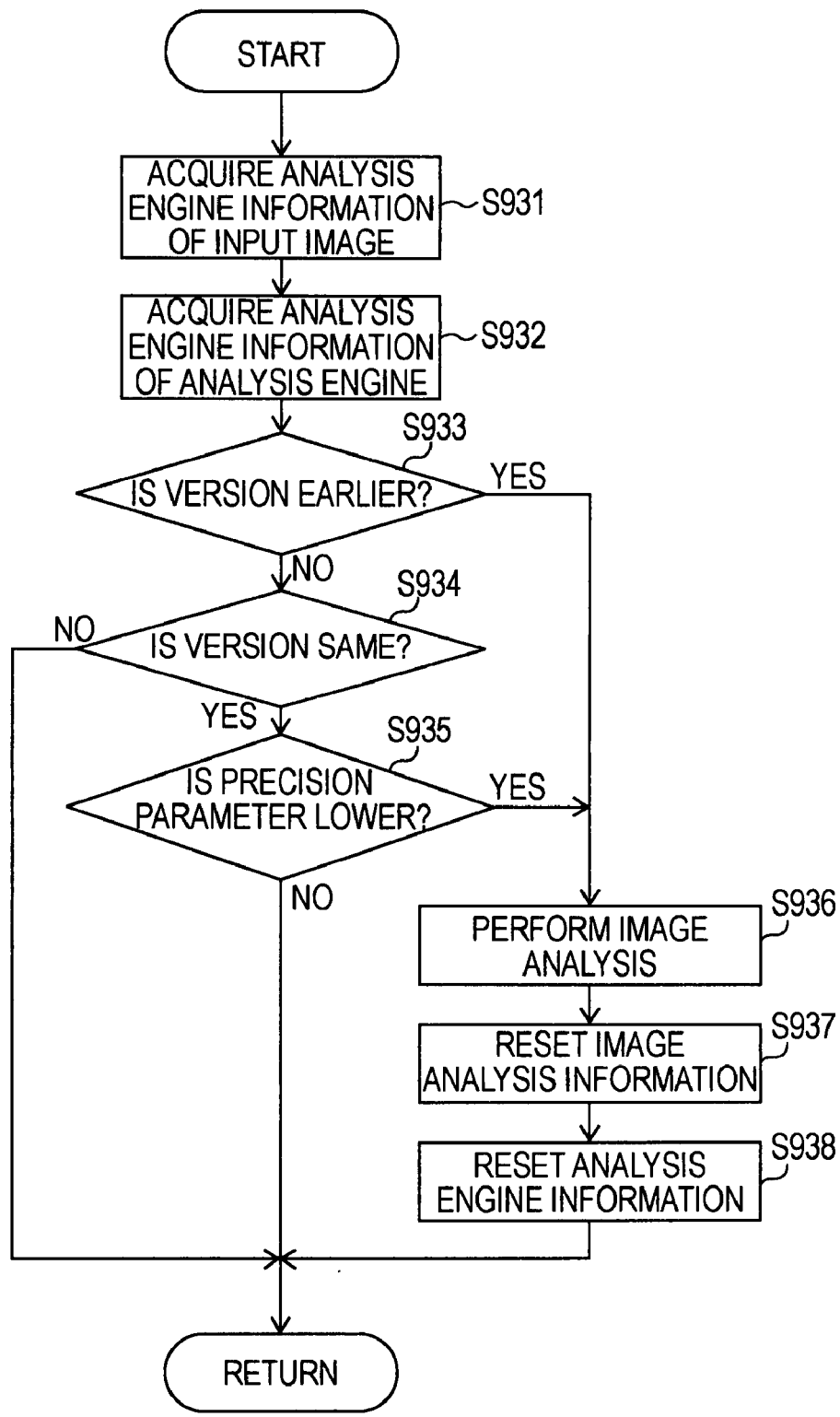
FIG. 11 illustrates a processing procedure of image analysis information update processing according to an embodiment of the present invention.

FIG. 11 illustrates an example of a procedure of image analysis information update processing which corresponds to the processing of STEP S930 of FIG. 10 according to an embodiment of the present invention.

Firstly, the input information acquiring unit 140 acquires the analysis engine information 93 of the input image file 90 (STEP S931). Then, the engine information acquiring unit 150 acquires the analysis engine information 132 of the image analysis engine 130 (STEP S932).

The update necessity determining unit 160 compares the version information contained in the analysis engine information 93 with the version information contained in the analysis engine information 132. As a result, if the version contained in the analysis engine information 93 is earlier than the version contained in the analysis engine information 132 (YES, in STEP S933), the following procedure is performed. Specifically, the image analysis engine 130 performs image analysis on the image data 91 (STEP S936). AS a result, the analysis information setting unit 182 resets the image analysis information 192 of the saved image file 190 (STEP S937).

In addition, the engine information setting unit 183 sets the analysis engine information 132 of the image analysis engine 130, which is acquired by the engine information acquiring unit 150, as the analysis engine information 193 of the saved image file 190 (STEP S938).

If the version contained in the analysis engine information 93 is the same as the version contained in the analysis engine information 132 (YES, in STEP S934), the parameter information contained in the analysis engine information 93 and the parameter information contained in the analysis engine information 132 are compared. As a result, if the precision parameter of the analysis engine information 93 is lower than that of the analysis engine information 132 (YES, in STEP S935), the processing of STEP S936 to STEP 938 described above is performed.

If the version indicated in the analysis engine information 93 is later than that indicated in the analysis engine information 132, or if both versions are the same and the precision parameter contained in the analysis engine information 93 is not lower than the precision parameter contained in the analysis engine information 132, the analysis information setting unit 182 sets the image analysis information 92 as the image analysis information 192. In addition, the engine information setting unit 183 sets the analysis engine information 93 as the analysis engine information 193. That is, no update of image analysis information is performed.

As described above, according to an embodiment of the present invention, the update necessity determining unit 160 determines whether or not an update of image analysis information is necessary on the basis of the analysis engine information 93 of the input image file 90 and the analysis engine information 132 of the image analysis engine 130 that is available.

Thus, even when version-up of the image analysis engine 130 of the server 10 is performed, a user can use the updated image analysis engine 130 without updating firmware of his or her terminal such as the digital still camera 21.

Even in a case where a user purchases a server with increased performance, the user can use a result of image analysis performed by the new server with increased analysis precision by connecting a conventional terminal to the server.

In addition, by including analysis engine information in metadata for an image file, it can be recognized by which image analysis engine the metadata is set and under what parameter the metadata is set. Thus, even when an image file is sent and received between different apparatuses, the same search result can be obtained in all of the apparatuses.

Further, even in the case where an image analysis is composed of a plurality of modules such as face detection and similar image analysis, reset is necessary for only a module that has been updated. This reduces processing time and cost.

It should be understood that the above embodiments of the present invention illustrate examples for implementing the present invention. The examples illustrated in the embodiments correspond to elements in the claims. However, the embodiments of the present invention are not limited to these examples and various modifications may be made without departing from the scope of the present invention.

Specifically, according to an aspect of the present invention, image analyzing means corresponds, for example, to the image analysis engine 130, image analysis processing type acquiring means corresponds, for example, to the engine information acquiring unit 150, and recording controlling means corresponds, for example, to the data setting unit 181, the analysis information setting unit 182, and the engine information setting unit 183.

According to an aspect of the present invention, input image setting information acquiring means corresponds, for example, to the input information acquiring unit 140, available setting information acquiring means corresponds, for example, to the engine information acquiring unit 150, update necessity determining means corresponds, for example, to the update necessity determining unit 160, and image analysis information setting means corresponds, for example, to the analysis information setting unit 182.

According to an aspect of the present invention, image recording means corresponds, for example, to the image recording unit of the computer 31, input image setting information acquiring means corresponds, for example, to the input information acquiring unit 140, available setting information acquiring means corresponds, for example, to the engine information acquiring unit 150, update necessity determining means corresponds, for example, to the update necessity determining unit 160, and image analysis information setting means corresponds, for example, to the analysis information setting unit 182.

According to an aspect of the present invention, image pickup means corresponds, for example, to the image pickup unit of the digital still camera 21, input image setting information acquiring means corresponds, for example, to the input information acquiring unit 140, available setting information acquiring means corresponds, for example, to the engine information acquiring unit 150, update necessity determining means corresponds, for example, to the update necessity determining unit 160, and image analysis information setting means corresponds, for example, to the analysis information setting unit 182.

According to an aspect of the present invention, input image setting information acquiring means corresponds, for example, to the input information acquiring unit 140, available setting information acquiring means corresponds, for example, to the engine information acquiring unit 150, update necessity determining means corresponds, for example, to the update necessity determining unit 160, image analysis information setting means corresponds, for example, to the analysis information setting unit 182, and image analysis information supplying means corresponds, for example, to the write back unit 199.

According to an aspect of the present invention, an image analyzing step corresponds, for example, to STEP S914, an image analysis processing type acquiring step corresponds, for example, to STEP S916, and a recording controlling step corresponds, for example, to STEP S918.

According to an aspect of the present invention, an input image setting information acquiring step corresponds, for example, to STEP S931, an available setting information acquiring step corresponds, for example, to STEP S932, an update necessity determining step corresponds, for example, to STEP S933 to STEP S935, and an image analysis information setting step corresponds, for example, to STEP S936 to STEP S938.

The processing steps described in the above embodiments can be considered as a method including a series of processing steps or as a program for causing a computer to execute the series of processing steps or a recording medium for storing the program.

It should be understood by those skilled in the art that various modifications, combinations, sub-combinations and alterations may occur depending on design requirements and other factors insofar as they are within the scope of the appended claims or the equivalents thereof.

The invention claimed is:

1. An image recording apparatus comprising:
   image analyzing means configured to execute predetermined image analysis processing on an input image so as to extract image analysis information;
   image analysis processing type acquiring means configured to acquire a type of the executed image analysis processing, wherein the type of the executed image analysis processing includes parameter information indicating a value indicating analysis precision of the image analysis processing for the image recording apparatus, the parameter information being provided to the image analyzing means and used by the image analyzing means, based on a result of a comparison between the value indicating analysis precision of the image analysis processing for the image recording apparatus and a value indicating analysis precision indicated in image analysis information associated with the input image, to execute the image analysis processing; and
   recording controlling means configured to record the extracted image analysis information and the type of the image analysis processing in a recording medium so as to be associated with the input image.

2. An image recording method comprising:
   executing predetermined image analysis processing on an input image so as to extract image analysis information;
   acquiring a type of the executed image analysis processing, wherein the type of the executed image analysis processing includes parameter information indicating a value indicating analysis precision of the image analysis processing, wherein the parameter information is provided and used, based on a result of a comparison between the value indicating analysis precision of the image analysis processing and a value indicating analysis precision indicated in image analysis information associated with the input image, in the executing image analysis processing; and
   executing recording control for recording the extracted image analysis information and the type of the image analysis processing in a recording medium so as to be associated with the input image.

3. An image recording apparatus comprising:
   an image analyzing unit configured to execute predetermined image analysis processing on an input image so as to extract image analysis information;
   an image analysis processing type acquiring unit configured to acquire a type of the executed image analysis processing, wherein the type of the executed image analysis processing includes parameter information indicating a value indicating analysis precision of the image analysis processing for the image recording apparatus, the parameter information being provided to the image analyzing unit and used by the image analyzing unit, based on a result of a comparison between the value indicating analysis precision of the image analysis processing for the image recording apparatus and a value indicating analysis precision indicated in image analysis information associated with the input image, to execute the image analysis processing; and
   a recording controlling unit configured to record the extracted image analysis information and the type of the image analysis processing in a recording medium so as to be associated with the input image.

\* \* \* \* \*

UNITED STATES PATENT AND TRADEMARK OFFICE
CERTIFICATE OF CORRECTION

PATENT NO.         : 8,200,018 B2
APPLICATION NO.    : 11/825672
DATED              : June 12, 2012
INVENTOR(S)        : Tomohiko Gotoh et al.

It is certified that error appears in the above-identified patent and that said Letters Patent is hereby corrected as shown below:

On the face of the patent, under section (75), "Daisuke Mochizuki, Tokyo (JP)" should read -- Daisuke Mochizuki, Chiba (JP) --.

Signed and Sealed this
Seventeenth Day of July, 2012

David J. Kappos
*Director of the United States Patent and Trademark Office*